US005578171A

United States Patent [19]
Pitkäjärvi

[11] Patent Number: 5,578,171
[45] Date of Patent: Nov. 26, 1996

[54] METHOD AND DEVICE FOR SUPPLYING PULP TO A HEADBOX OF A PAPER MACHINE

[75] Inventor: Kari Pitkäjärvi, Jyväskylä, Finland

[73] Assignee: Valmet Corporation, Helsinki, Finland

[21] Appl. No.: 197,292

[22] Filed: Feb. 16, 1994

[30] Foreign Application Priority Data

Feb. 18, 1993 [FI] Finland ................................ 930735

[51] Int. Cl.⁶ ............................................ D21F 1/00
[52] U.S. Cl. ........................ 162/216; 162/336; 162/212
[58] Field of Search .............................. 285/405, 410, 285/413, 420, 748; 162/336, 338, 343, 341, 216, 212

[56] References Cited

U.S. PATENT DOCUMENTS

| | | | |
|---|---|---|---|
| 1,774,363 | 8/1930 | Fletcher | 162/339 |
| 2,617,672 | 11/1952 | Nichols | 403/183 |
| 4,163,571 | 8/1979 | Nash | 285/106 |
| 4,659,118 | 4/1987 | Schwyter et al. | 285/55 |

FOREIGN PATENT DOCUMENTS

| | | |
|---|---|---|
| 780773 | 9/1978 | Finland . |
| 892795 | 12/1990 | Finland . |
| 2567081 | 1/1986 | France . |
| 2750649 | 5/1979 | Germany . |
| 3515494 | 11/1986 | Germany . |
| 393068 | 3/1962 | Switzerland . |
| 1581051 | 12/1980 | United Kingdom . |
| 2167512 | 5/1986 | United Kingdom . |

*Primary Examiner*—Donald E. Czaja
*Assistant Examiner*—Calvin Padgett
*Attorney, Agent, or Firm*—Steinberg, Raskin & Davidson, P.C.

[57] ABSTRACT

A movement compensator apparatus and method for compensating for movements taking place during tilting of a headbox of a paper machine and preventing transfer of strains from a pulp supply pipe in the headbox to a stationary pulp supply pipe. The movement compensator has a first pipe connected to the supply pipe by a connecting flange that permits rotation of the first pipe and the supply pipe relative to one another, and a second pipe connected to the first pipe by another connecting flange that permits rotation of the first pipe and the second pipe relative to one another. The second pipe is further connected to the stationary supply pipe by a third connecting flange that also permits rotation of the second pipe and the stationary supply pipe relative to one another.

10 Claims, 6 Drawing Sheets

FIG. 2C $L_1 \approx 30\,mm$ $L_2 \approx 30\,mm$

METHOD AND DEVICE FOR SUPPLYING PULP TO A HEADBOX OF A PAPER MACHINE

BACKGROUND OF THE INVENTION

The present invention relates to a method and device for supplying pulp through a supply pipe to an inlet header of a headbox of a paper machine, more specifically, a movement compensator, which permits tilting of the headbox without causing excessive torsional tensions in the supply pipe.

The supply pipe connected to a headbox of a paper machine is often provided with means that permit rotation of the supply pipe so that the headbox of a paper machine can tilted as desired and discharge pulp from a discharge opening therein. It is known in the prior art to manufacture at least a portion of the supply pipe from an elastic material which permits rotation of the supply pipe while the opposite end of the elastic construction remains stationary. A drawback of this construction is the poor strength of the material. During tilting of the headbox, the end connected with the headbox moves along a relatively wide path while the opposite end of the supply pipe remains stationary. The material is subjected to a high torsional strain, as a result of which the service life of the pipe is reduced.

OBJECTS AND SUMMARY OF THE INVENTION

It is an object of the present invention to provide a new and improved connection between a stationary pulp supply pipe and the headbox to prevent the formation of torsional strains in the supply pipe during tilting movements of the headbox.

It is another object of the present invention to provide a connection between a stationary pulp supply pipe and a headbox without producing significant directional changes in the flow of the pulp from the supply pipe to the headbox.

Accordingly, in the present invention, a joint construction is formed that permits a tilting movement of a headbox, i.e., a movement compensator, in conjunction with the supply pipe connected to the headbox. The joint construction comprises a first pipe, which is linked to, and placed in an oblique angle in relation to, the pulp-flow header in the headbox so that it permits rotation of the header in relation to the first pipe and vice versa. The first pipe of the movement compensator is connected with a second pipe, which is installed at an oblique angle in relation to the first pipe of the movement compensator.

The first pipe of the compensator is linked by means of a flange joint that permits its rotation in relation to the feed pipe through which pulp is supplied and, in a corresponding way, the first pipe is linked by means of a similar flange joint that permits its rotation in relation to the second pipe of the compensator. The second pipe of the compensator is linked by means of another flange joint so that it can rotate in relation to the pulp supply pipe placed in a stationary position.

When the headbox of the paper machine is pivoted around its pivot shaft, the movement compensator in accordance with the present invention permits the pivoting movement. The movement compensator in accordance with the invention, which is a sort of an articulated crank mechanism, permits shifting of the headbox both in the y-direction and in the z-direction. Thus, pivoting movements of the headbox do not produces strains in the stationary pulp supply pipe.

Also, the running of the flow of the pulp through the compensator is smooth because the pipe arrangement in the compensator does not have major directional changes in the direction of running of the pulp flow. In a preferred embodiment, the difference in height between the center line of the supply pipe and the end of the first pipe of the compensator is about 30 mm and, in a corresponding way, the distance between the end of the first pipe and the central axis of the pulp feed pipe is about 30 mm.

In the construction in accordance with the present invention which is connected to the supply pipe of the headbox of the paper machine, the movement compensator comprises a first pipe, connected to the supply pipe by means of a connecting flange that permits rotation, and a second pipe connected to the first pipe by means of another connecting flange that permits rotation. The second pipe is further connected to the stationary supply pipe by means of an additional connecting flange that permits rotation.

In the method in accordance with the invention, a first pipe is connected to a pulp supply pipe in the headbox via a first connecting flange which permits rotation of the first pipe and the pulp supply pipe on the headbox with respect to each other. The method also includes connecting the first pipe to a second pipe via a second connecting flange which permits rotation of the first pipe and the second pipe with respect to each other, and connecting the second pipe to a stationary pulp supply pipe via a third connecting flange which permits rotation of the second pipe and the stationary supply pipe with respect to each other. The first pipe may be arranged such that a central axis of the first pipe is at an oblique angle in relation to a central axis of the supply pipe in the headbox. The second pipe may be arranged such that a central axis of the second pipe is at an oblique angle in relation to the central axis of the first pipe. At least one and preferably all of the connecting flanges are provided with a groove shape to receive end portions of a pair of pipes connected by the connecting flanges.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
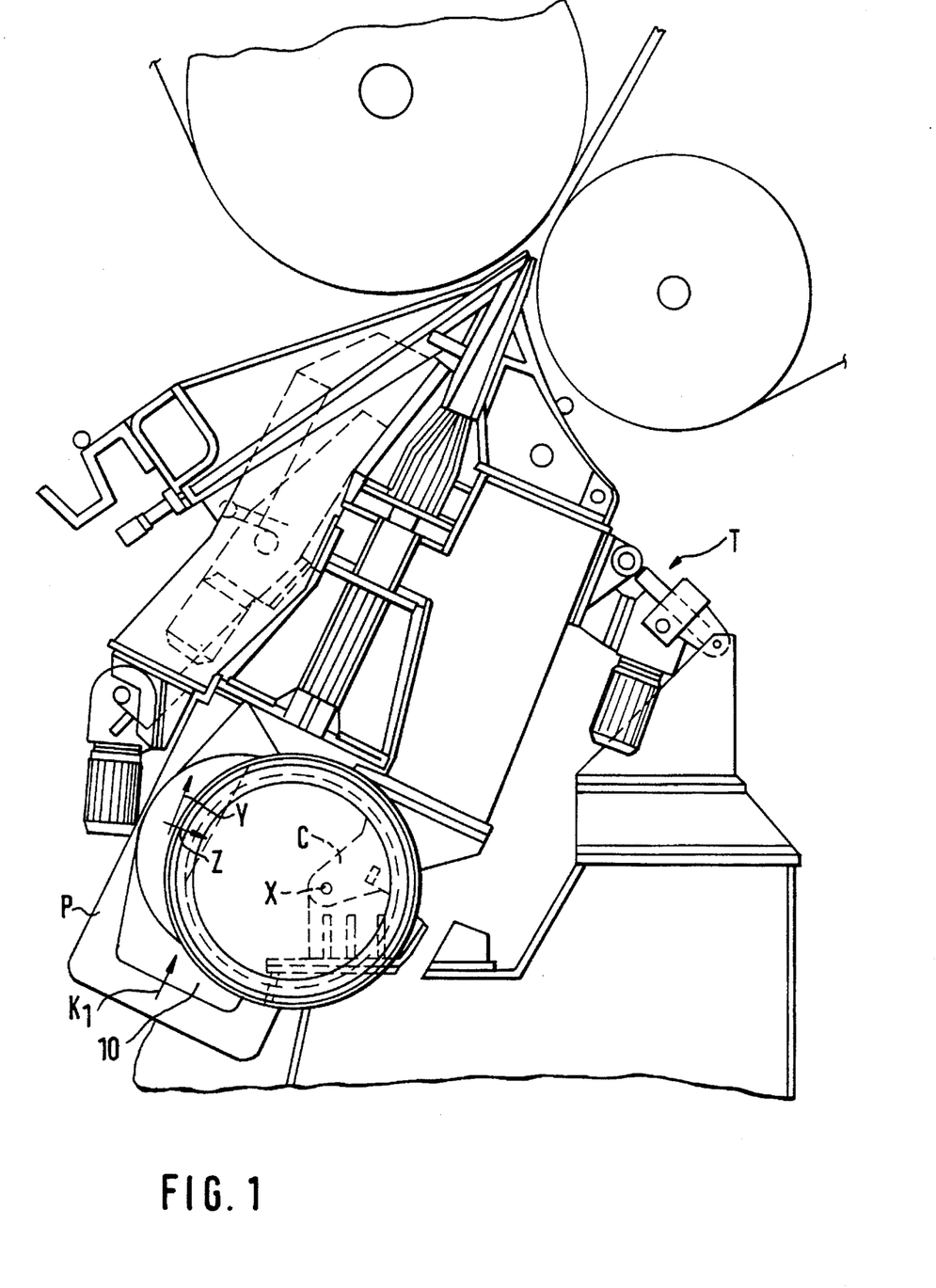
FIG. 1 is a side view of the headbox of a paper machine.

Referring to the drawings, FIG. 1 is a side view of a headbox P of a paper machine. The headbox of the paper machine is tilted by means of an actuator T. The geometric pivot axis of the headbox of the paper machine at bracket C is, in FIG. 1, denoted by the letter X. The inlet header of the headbox P of the paper machine is connected with a paper-pulp supply pipe $S_1$. As an articulation point that permits rotation of the pipe $S_1$, the supply pipe $S_1$ comprises a connecting flange 10 which connects the supply pipe $S_1$ to an intake pipe $S_2$.

Figure 2A:
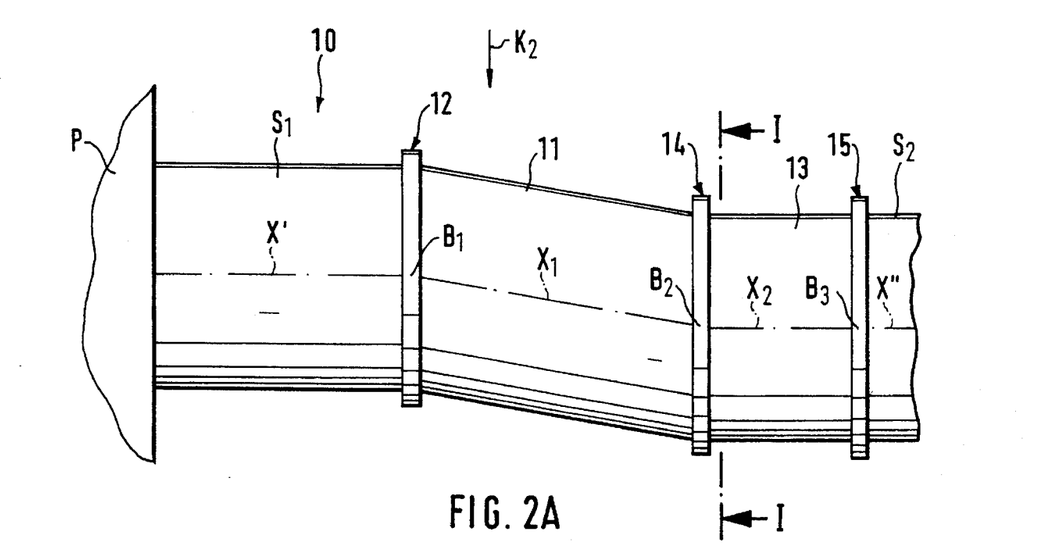
FIG. 2A shows a movement compensator in accordance with the present invention installed in the supply pipe connected with the pulp-flow header when viewed in the direction $K_1$ indicated in FIG. 1.
Figure 2B:
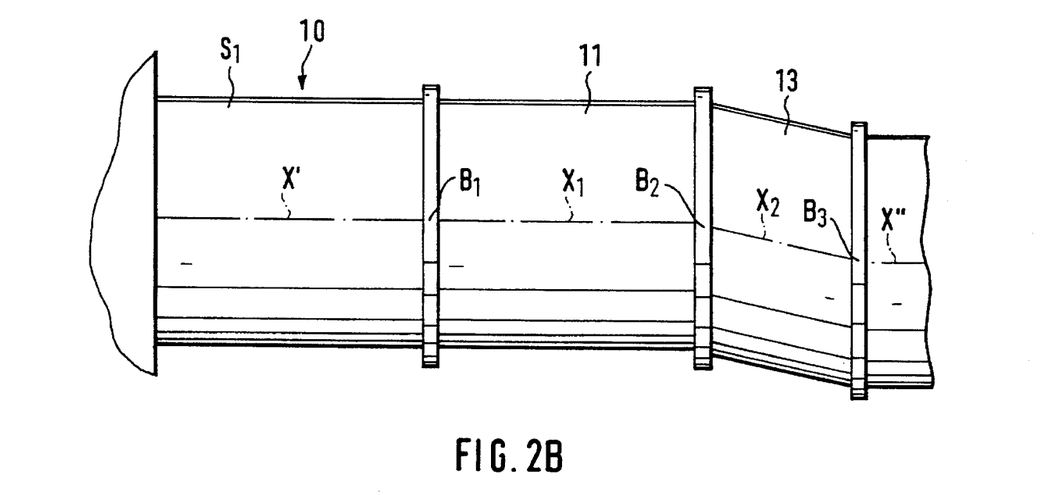
FIG. 2B shows the movement compensator in accordance with the present invention viewed in the direction of the arrow $K_2$ indicated in FIG. 2A.

FIGS. 2A and 2B show a supply pipe $S_1$, which is connected to a headbox P of the paper machine and which is also connected to a stationary pulp supply pipe $S_2$ by means of a compensator construction 10 in accordance with the present invention which permits movement of the pipe $S_1$. The geometric central axis of the supply pipe $S_1$ is denoted by X'. The central axis of the stationary pulp supply pipe $S_2$ is denoted with X". The movement compensator 10 comprises a first pipe 11 linked to the supply pipe $S_1$ by means of an articulated connecting flange 12 that permits rotation. The first pipe 11 is mounted so that its central axis $X_1$ is placed at an oblique angle ($\alpha$) in relation to the central axis X' of the supply pipe $S_1$. The connecting pipe 11 is connected to the second pipe 13 by means of a connecting flange 14 which permits rotation of the pipes 11,13. The second pipe 13 is arranged in a direction which is inclined at an angle $\beta$ in relation to the first pipe 11 and to its central axis $X_1$ and is connected to the stationary pulp supply pipe $S_2$ by means of a connecting flange 15 so that rotation of the pipes in relation to one another is permitted. The central axis $X_2$ of the second pipe 13 is aligned with the central axis of the pulp supply pipe $S_2$ as shown in FIG. 2A or may be positioned at an angle to the central axis of the pulp supply pipe $S_2$ as shown in FIG. 2B.

Figure 2C:
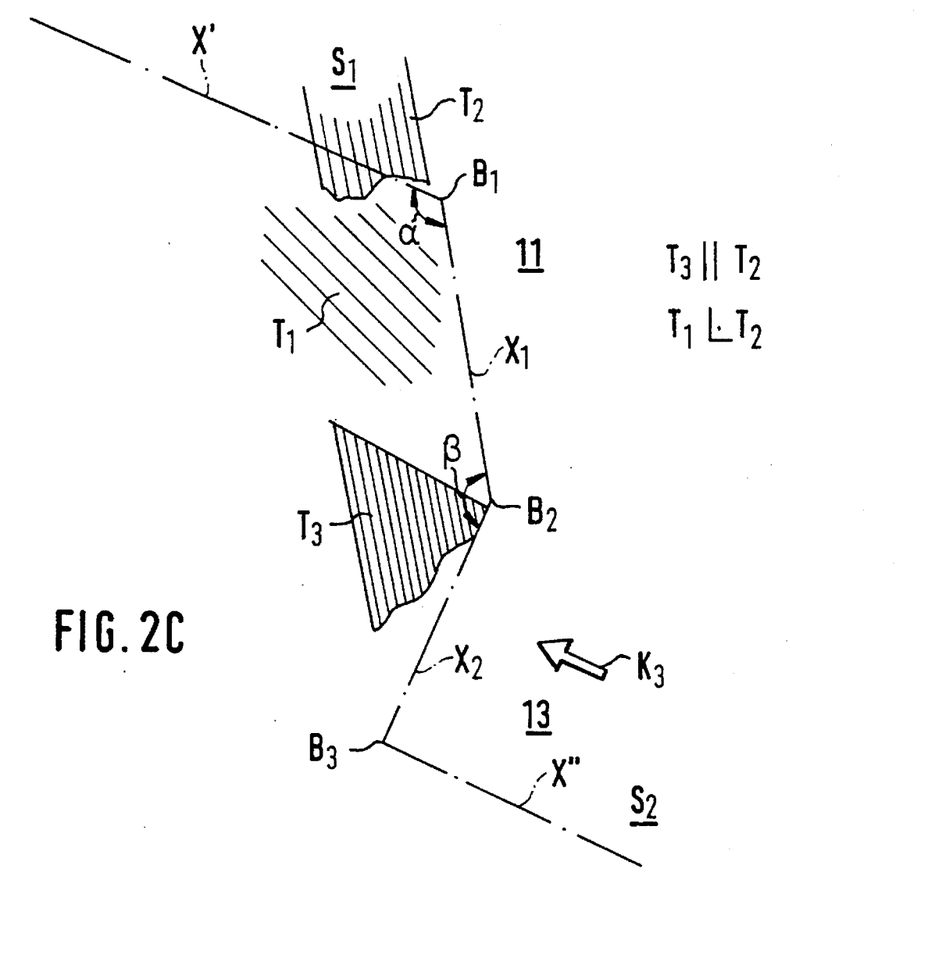
FIG. 2C is an axonometric illustration of the geometry of the movement compensator in accordance with the present invention.

FIG. 2C illustrates the movement geometry of the compensator in accordance with the invention. The movement compensator comprises a pipe construction for connecting the supply pipe $S_1$ to the stationary pulp supply pipe $S_2$. The compensator 10 comprises a first pipe 11 and a second pipe 13. Between the first pipe 11 and the second pipe 13, there is a flange joint 14 that permits rotation of the pipes in relation to one another. Between the first pipe 11 and the supply pipe $S_1$ there is a flange joint 12 that permits rotation of the pipes 11,$S_1$ in relation to one another, and between the second pipe 13 and the supply pipe $S_2$, there is a flange joint 15 that permits rotation of the pipes 13,$S_2$ in relation to one another. The common plane of the central axis X' of the supply pipe $S_1$ and of the central axis $X_1$ of the first pipe 11 of the compensator 10 is denoted by $T_1$. In FIG. 2C, the plane that is perpendicular to the plane $T_1$, and in which the central axis X' of the supply pipe $S_1$ is placed, is denoted by $T_2$. In the construction in accordance with the invention, the second pipe 13 of the compensator is placed in plane $T_3$, which is parallel to the plane $T_2$. By means of this arrangement, tilting of the headbox during operation and, thus shifting of the supply pipe $S_1$ both in the direction Y and in the direction Z (in FIG. 1) are permitted without causing substantial torsional strains in the pipes.

Figure 2D:
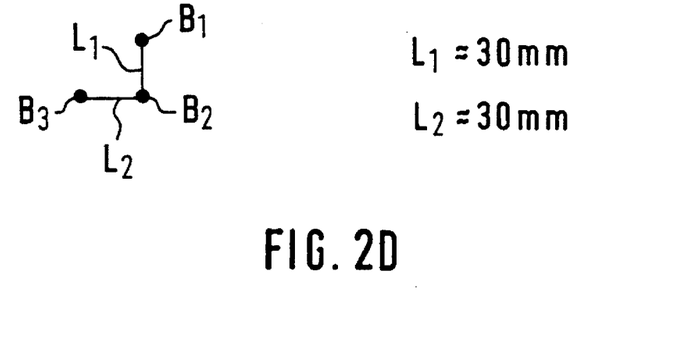
FIG. 2D shows the geometry of the illustration of FIG. 2C viewed in the direction of the arrow $K_3$.

FIG. 2D shows the arrangement of pipe equipment viewed in the direction of the arrow $K_3$ in FIG. 2C. End points $B_1$, $B_2$ and $B_3$ are shown of the central axes of the pipes $S_1$, 11 and 13, respectively, viewed in the direction $K_3$. The distance $L_1$ between end points $B_1$ and $B_2$ is about 30 mm, and the distance $L_2$ between end points $B_2$ and $B_3$ is also about 30 mm. This preferred arrangement prevents substantial directional changes in the pulp flow path from the stationary pulp supply pipe $S_2$ to the supply pipe $S_1$ of the headbox.

When the compensator is placed in its position in connection with the supply pipe $S_1$ and $S_2$, the pipe 11 is preferably placed so that the plane $T_1$ intersects the pivot axis $X_3$ about which the headbox P is tilted. In such a case, both the central axis X' of the supply pipe $S_1$ and the central axis X" of the stationary supply pipe $S_2$ can be kept on the same line in the vertical plane and so that there is just a small difference in height, e.g., about 30 mm, between them.

Figure 3:
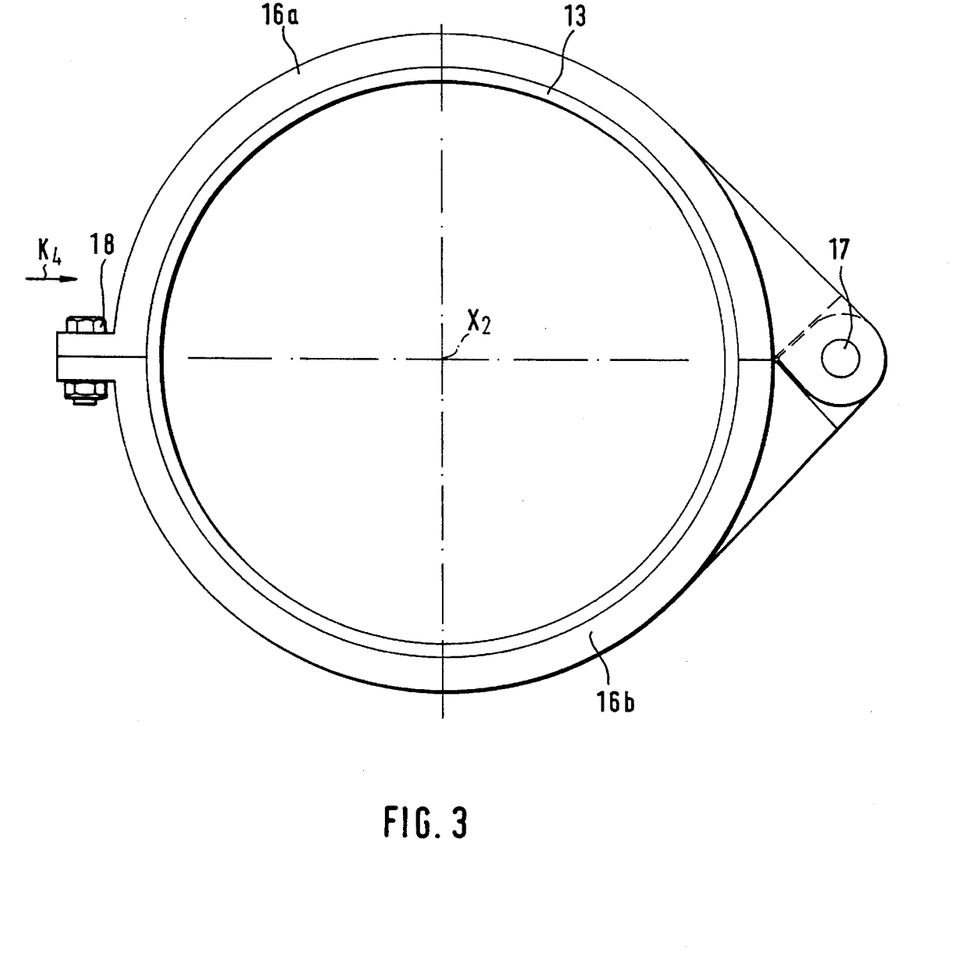
FIG. 3 is a sectional view taken along the line I—I in FIG. 2A.

FIG. 3 shows a sectional view of the connecting flange construction used in the present invention taken along the line I—I in FIG. 2A. The connecting flange construction 14 comprises a joint collar 16 which may be opened. Flange 14 has two sides and comprises collar halves 16a,16b linked to each other at an articulation point 17. The collar halves 16a,16b of the joint collar are joined together by means of a screw 18 which passes through the brackets provided on the collar parts at an opposite end of the flange 14 from the articulation point 17. Other suitable connection means may also be used in the present invention.

Figure 4:
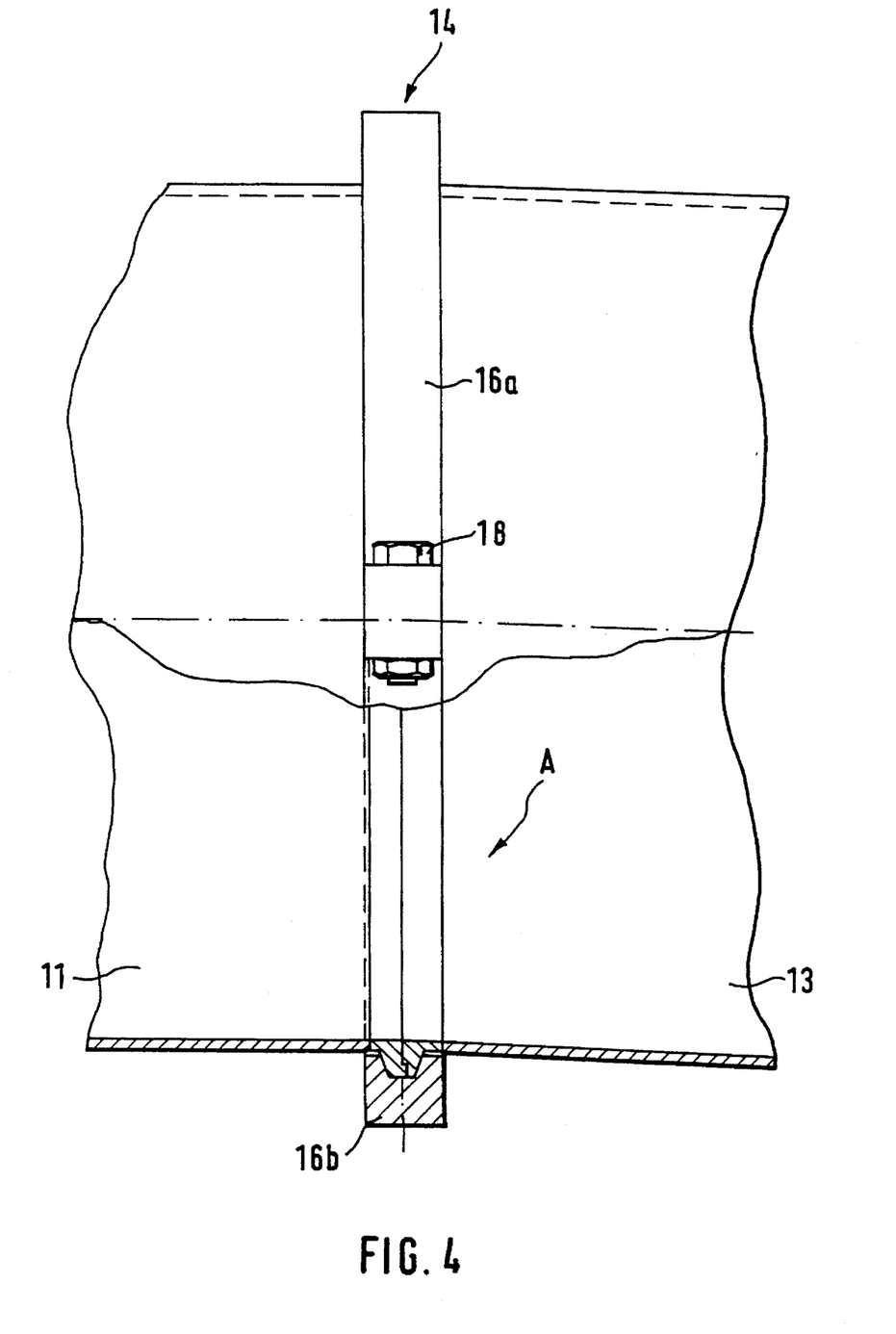
FIG. 4 is a side view, partially in section, of the flange construction used in the present invention viewed in the direction of the arrow $K_4$ in FIG. 3.

FIG. 4 shows the flange construction viewed in the direction of arrow $K_4$ in FIG. 3, i.e., as a side view partly in section.

Figure 5:
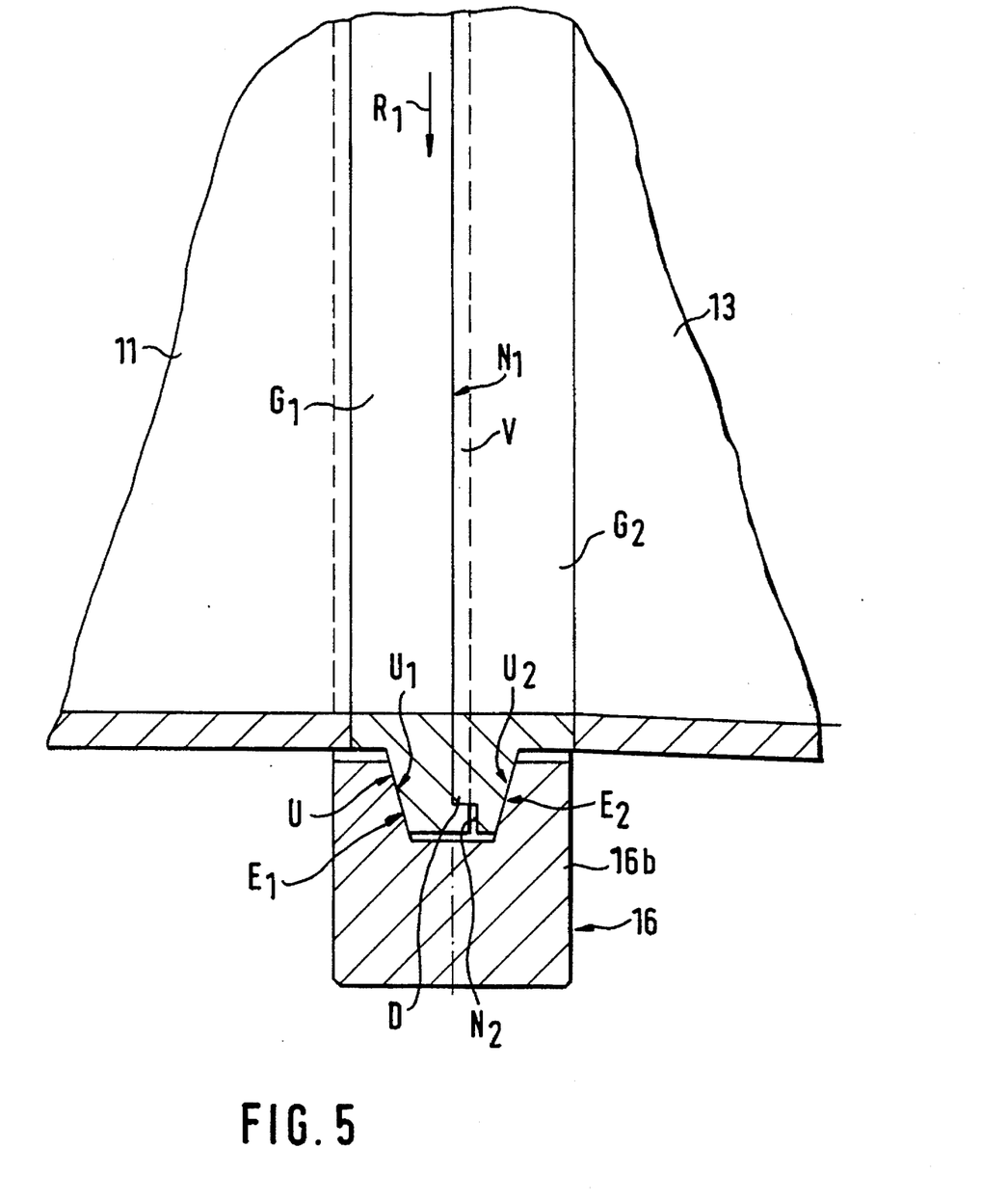
FIG. 5 is an enlarged illustration of the area A in FIG. 4.

FIG. 5 shows an enlarged illustration of area A of the joint flange construction 14 shown in FIG. 4. The first pipe 11 of the compensator is provided with an end portion $G_1$ having a shoulder and a flow opening. The second pipe 13 has an end portion $G_2$ provided with a shoulder and a flow opening. The side faces $E_1$ and $E_2$ of the end portions $G_1$,$G_2$ with shoulders are placed at an oblique angle in relation to the radius $R_1$ of the joint, in which case, by turning the screw 18, it is possible to regulate the force with which the pipes 11,13 are pressed against one another. The tightening force of the screw is determined so that rotation of the first pipe 11 in relation to the second pipe 13 is permitted. The side faces are jointly operative, by a wedge effect, with the side faces $U_1$ and $U_2$ of the groove U in the collar. The joint collar 16 comprises a U-shaped groove section whose form corresponds to the outer shape of the shoulders $G_1$,$G_2$. When the joint collar 16 halves 16a,16b are joined together by means of the screw 18, the pipe portions 11,13 to be joined together are pressed against one another and kept together.

The pipe 11, which is provided with the end shoulder $G_1$, comprises a groove V in a front face $N_1$ of the shoulder $G_1$. The shoulder end $G_2$ of the pipe portion 13 to be connected with end shoulder $G_1$ can be placed into groove V so that the front-face shoulder D placed on the front face $N_2$ of the shoulder end is placed into the groove V.

FIG. 5 shows the area A in FIG. 4, i.e., the area in which the connecting flange 14 is arranged between the pipes 11 and 13. A construction similar to that described in relation to FIG. 5 is also provided between the pipe 11 and the supply pipe $S_1$, i.e., the connecting flange construction 12 is similar to the connecting flange construction 14. In addition, between the pipe 13 and the stationary supply pipe $S_2$, there is a construction similar to that between the pipe 11 and the pipe 13, i.e., the connecting flange construction 15 is similar to the connecting flange constructions 14 and 12. Thus, only one of the connecting flange constructions is illustrated by way of example, i.e., the connecting flange construction 14 between the compensator pipes 11 and 13.

The examples provided above are not meant to be exclusive. Many other variations of the present invention would be obvious to those skilled in the art, and are contemplated to be within the scope of the appended claims.

I claim:

1. An arrangement of a headbox of a paper machine and an apparatus for compensating for movements taking place during tilting of the headbox and preventing transfer of strains from a pulp supply pipe in the headbox to a stationary pulp supply pipe, said apparatus comprising a first straight pipe having first and second opposed ends and a straight central axis extending from said first end to said second end, first connecting flange means for rotatably coupling said first end of said first pipe directly to the pulp supply pipe in the headbox such that the straight central axis of said first pipe is at an oblique angle with respect to a central axis of the pulp supply pipe in the headbox, said first connecting flange means enabling rotation of said first pipe relative to the pulp supply pipe in the headbox such that said second end of said first pipe is moved to different positions relative to said first end of said first pipe upon rotation of said first pipe relative to the pulp supply pipe in the headbox, a second straight pipe having first and second opposed ends and a straight central axis extending from said first end to said second end, second connecting flange means for rotatably coupling said second end of said first pipe directly to said first end or said second pipe such that the straight central axis of said second pipe is at an oblique angle with respect to the central axis of said first pipe, said second connecting flange means enabling rotation of said first pipe and said second pipe relative to each other such that said second end of said second pipe is moved to different positions relative to said first end of said second pipe upon rotation of said first pipe relative to said second pipe, and third connecting flange means for rotatably coupling said second end of said second pipe to a stationary pulp supply pipe, said third connecting flange means enabling rotation of said second pipe relative to the stationary supply pipe such that said first end of said second pipe is moved to different positions relative to said second and of said second pipe upon rotation of said second pipe relative to the stationary supply pipe.

2. The arrangement of claim 1, wherein said second pipe is arranged in a first plane at an oblique angle with respect to the central axis of said first pipe, said first plane being parallel to a second plane perpendicular to a common plane of the central axis of the supply pipe in the headbox and the central axis of said first pipe, said second plane running through the central axis of the supply pipe in the headbox.

3. The arrangement of claim 1, wherein at least one of said first, second and third connecting flange means comprises a joint collar having a groove therein, said groove being shaped to receive end portions of a pair of pipes connected by means of said at least one of said first, second and third connecting flange means.

4. The arrangement of claim 3, wherein said joint collar comprises a pair of collar halves and a screw for joining said collar halves together, such that a tensioning force applied by said screw to join said collar halves together presses shoulders on said end portions of said pair of pipes against one another, the tensioning force being limited to permit rotation of said pair of pipes relative to one another.

5. The arrangement of claim 4, wherein said end portions of said pair of pipes have side faces arranged at an oblique angle with respect to a radial direction of said joint collar, such that the side faces are jointly operative with a wedge effect in said groove of said joint collar.

6. The arrangement of claim 3, wherein an end portion of a first one of said pair of pipes comprises a second groove in a front face thereof, an end portion of a second one of said pair of pipes having a shoulder on a front face thereof, said shoulder being receivable within said second groove.

7. A method for compensating for movements taking place during tilting of a headbox of a paper machine and preventing transfer of strains from a pulp supply pipe in the headbox to a stationary pulp supply pipe, comprising the steps of:

connecting a first end of a first straight pipe having first and second opposed ends and a straight central axis extending therebetween to the pulp supply pipe in the headbox via a first connecting flange such that the straight central axis of the first pipe is at an oblique angle with respect to a central axis of the pulp supply pipe in the headbox, the first connecting flange enabling rotation of the first pipe and the pulp supply pipe in the headbox relative to each other such that the second end of the first pipe is moved to different positions relative to the first end of the first pipe upon rotation of the first pipe relative to the pulp supply pipe in the headbox, connecting the second end of the first pipe to a first end of a second straight pipe having first and second opposed ends and a straight central axis extending therebetween via a second connecting flange such that the straight central axis of the second pipe is at an oblique angle with respect to the central axis of the first pipe, the second connecting flange enabling rotation of the first pipe and the second pipe relative to each other such that the second end of the second pipe is moved to different positions relative to the first end of the second pipe upon rotation of the first pipe relative to the second pipe, and connecting the second end of the second pipe to the stationary pulp supply pipe via a third connecting flange which permits rotation of the second pipe and the stationary supply pipe relative to each other such that the first end of the second pipe is moved to different positions relative to the second end of the second pipe upon rotation of the second pipe relative to the stationary supply pipe.

8. The method of claim 7, further comprising the step of providing at least one of said first, second and third connecting flanges with a groove shaped to receive end portions of a pair of pipes connected by said at least one of said first, second and third connecting flanges.

9. An arrangement of a headbox of a paper machine and an apparatus for compensating for movements taking place during tilting of the headbox and preventing transfer of strains from a pulp supply pipe in the headbox to a stationary pulp supply pipe, said apparatus comprising a first pipe, a first connecting flange for connecting said first pipe to the pulp supply pipe in the headbox, said first connecting flange being structured and arranged to permit rotation of said first pipe and the pulp supply pipe in the headbox relative to each other, a second pipe, a second connecting flange for connecting said first pipe to said second pipe, said second connecting flange being structured and arranged to permit rotation of said first pipe and said second pipe relative to each other, a third connecting flange for connecting said second pipe to a stationary pulp supply pipe, said third connecting flange being structured and arranged to permit rotation of said second pipe and the stationary supply pipe relative to each other, and at least one of said first, second and third connecting flanges comprising a joint collar having a first groove therein, said first groove being shaped to receive end portions of a pair of pipes connected by means of said at least one of said first, second and third connecting flanges, an end portion of a first one of said pair of pipes comprising a second groove in a front face thereof, an end portion of a second one of said pair of pipes having a shoulder on a front face thereof, said shoulder being receivable within said second groove.

10. The arrangement of claim 9, wherein said first and second pipes are straight.

\* \* \* \* \*